(12) United States Patent
Cunningham

(10) Patent No.: US 10,860,025 B2
(45) Date of Patent: Dec. 8, 2020

(54) MODELING GRAPH OF INTERACTIONS BETWEEN AGENTS

(71) Applicant: TOYOTA RESEARCH INSTITUTE, INC., Los Altos, CA (US)

(72) Inventor: Alexander Glencairn Cunningham, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 8 days.

(21) Appl. No.: 15/980,425

(22) Filed: May 15, 2018

(65) Prior Publication Data

US 2019/0354105 A1   Nov. 21, 2019

(51) Int. Cl.
*G05D 1/00* (2006.01)
*G05D 1/02* (2020.01)

(52) U.S. Cl.
CPC ......... *G05D 1/0212* (2013.01); *G05D 1/0088* (2013.01); *G05D 1/0246* (2013.01); *G05D 1/0257* (2013.01)

(58) Field of Classification Search
None
See application file for complete search history.

(56) References Cited

U.S. PATENT DOCUMENTS

| | | | |
|---|---|---|---|
| 7,610,121 B2 | 10/2009 | Nishira et al. | |
| 8,738,228 B2 * | 5/2014 | Filev | B62D 6/007 701/40 |
| 8,761,991 B1 * | 6/2014 | Ferguson | G08G 1/096725 701/28 |
| 8,886,365 B2 * | 11/2014 | Filev | B60Q 9/00 701/1 |
| 8,930,085 B2 * | 1/2015 | Takeuchi | B60W 50/085 701/48 |
| 8,954,232 B2 * | 2/2015 | Takeuchi | B60W 10/22 701/37 |

(Continued)

FOREIGN PATENT DOCUMENTS

WO   2015047179 A1   4/2015

OTHER PUBLICATIONS

"Graph-Based Context Representation, Environment Modeling and Information Aggregation for Automated Driving," 2014 Intelligent Vehicles Symposium Proceedings, Jun. 2014.

(Continued)

*Primary Examiner* — Jonathan M Dager
(74) *Attorney, Agent, or Firm* — Seyfarth Shaw LLP

(57) ABSTRACT

A method for configuring a behavior for a subject vehicle is presented. The method includes observing a first behavior of an agent during a first time period and estimating a first set of behavioral constraints followed by the agent based on the observed first behavior. The method also includes observing a second behavior of the agent during a second time period and determining whether the agent is behaving in accordance with the first set of behavioral constraints based on the second behavior. The method still further includes adjusting the first set of behavioral constraints when the agent is not operating in accordance with the estimated set of behavioral constraints. The method also includes adjusting the behavior of the subject vehicle based on the adjusted first set of estimated behavioral constraints.

19 Claims, 6 Drawing Sheets

(56) References Cited

U.S. PATENT DOCUMENTS

| | | | |
|---|---|---|---|
| 9,056,616 B1* | 6/2015 | Fields | G09B 5/00 |
| 9,248,834 B1* | 2/2016 | Ferguson | B60W 30/0956 |
| 9,330,571 B2* | 5/2016 | Ferguson | B60W 50/0097 |
| 9,428,195 B1* | 8/2016 | Surpi | G06F 16/955 |
| 9,493,149 B2* | 11/2016 | Phelan | B60W 10/04 |
| 9,495,874 B1* | 11/2016 | Zhu | B60W 30/09 |
| 9,501,932 B2* | 11/2016 | Sakai | G08G 1/161 |
| 9,550,497 B2* | 1/2017 | Jeon | B60W 50/10 |
| 9,727,820 B2* | 8/2017 | Ono | G08G 1/09626 |
| 9,914,460 B2* | 3/2018 | Hunt | B60W 30/08 |
| 9,953,538 B1* | 4/2018 | Matthiesen | B60Q 1/268 |
| 10,054,945 B2* | 8/2018 | Zhu | B60W 10/20 |
| 10,268,191 B1* | 4/2019 | Lockwood | G05D 1/0044 |
| 10,621,858 B1* | 4/2020 | DeCastro | G01C 3/06 |
| 10,627,818 B2* | 4/2020 | Sapp | G01S 17/931 |
| 10,640,111 B1* | 5/2020 | Gutmann | B60W 60/0011 |
| 10,678,245 B2* | 6/2020 | Jammalamadaka | G06N 7/005 |
| 2001/0021891 A1* | 9/2001 | Kusafuka | F16H 61/0213 701/57 |
| 2007/0288140 A1* | 12/2007 | Wheals | B60W 30/188 701/36 |
| 2009/0099727 A1* | 4/2009 | Ghoneim | B60W 50/085 701/36 |
| 2009/0143961 A1* | 6/2009 | Gaviani | B60W 40/09 701/110 |
| 2009/0146846 A1* | 6/2009 | Grossman | G06F 3/0482 340/988 |
| 2009/0312926 A1* | 12/2009 | MacFarlane | B60W 10/06 701/59 |
| 2009/0326753 A1* | 12/2009 | Chen | G09B 9/04 701/31.4 |
| 2010/0036578 A1 | 2/2010 | Taguchi et al. | |
| 2010/0209891 A1* | 8/2010 | Lin | G09B 19/167 434/66 |
| 2010/0209892 A1* | 8/2010 | Lin | G09B 19/167 434/71 |
| 2010/0211270 A1* | 8/2010 | Chin | B62D 6/007 701/44 |
| 2011/0118929 A1* | 5/2011 | Takae | G08G 1/166 701/31.4 |
| 2011/0140919 A1* | 6/2011 | Hara | G08G 1/163 340/907 |
| 2011/0199199 A1* | 8/2011 | Perkins | B60Q 9/008 340/435 |
| 2012/0083960 A1* | 4/2012 | Zhu | B60R 1/00 701/23 |
| 2014/0240113 A1* | 8/2014 | Pottier | B62J 6/02 340/432 |
| 2015/0228195 A1* | 8/2015 | Beaurepaire | B60Q 1/50 340/907 |
| 2015/0266477 A1* | 9/2015 | Schmudderich | B60W 40/04 701/98 |
| 2015/0329043 A1* | 11/2015 | Skvarce | B60R 21/34 340/435 |
| 2015/0332114 A1* | 11/2015 | Springer | B60W 50/14 348/148 |
| 2015/0336502 A1* | 11/2015 | Hillis | G06F 3/017 701/23 |
| 2016/0059855 A1* | 3/2016 | Rebhan | B60W 30/095 701/41 |
| 2016/0176412 A1* | 6/2016 | Gunaratne | B60W 30/02 701/23 |
| 2016/0179094 A1* | 6/2016 | Sorokin | B60Q 1/525 701/23 |
| 2016/0231746 A1* | 8/2016 | Hazelton | B60W 30/00 |
| 2016/0311431 A1* | 10/2016 | Kato | B60W 30/095 |
| 2016/0357188 A1* | 12/2016 | Ansari | G06K 9/00805 |
| 2016/0358477 A1* | 12/2016 | Ansari | G06Q 30/0251 |
| 2017/0031361 A1* | 2/2017 | Olson | G06K 9/00791 |
| 2017/0120804 A1* | 5/2017 | Kentley | B60W 30/08 |
| 2017/0120904 A1* | 5/2017 | Kentley | G10K 11/26 |
| 2017/0329332 A1* | 11/2017 | Pilarski | B60W 30/0956 |
| 2018/0072218 A1* | 3/2018 | Sweeney | B60Q 1/50 |
| 2018/0370502 A1* | 12/2018 | Wang | G08G 1/166 |
| 2019/0051179 A1* | 2/2019 | Alvarez | H04W 12/009 |
| 2019/0113927 A1* | 4/2019 | England | G05D 1/0231 |
| 2019/0118783 A1* | 4/2019 | Breuer | B60R 21/01 |
| 2019/0122037 A1* | 4/2019 | Russell | B60W 30/0956 |
| 2019/0221118 A1* | 7/2019 | Kume | G08G 1/167 |
| 2019/0329772 A1* | 10/2019 | Graves | B60W 30/16 |
| 2019/0369637 A1* | 12/2019 | Shalev-Shwartz | G06K 9/00791 |
| 2019/0377352 A1* | 12/2019 | Wei Wange | B60W 30/0956 |
| 2019/0377354 A1* | 12/2019 | Shalev-Shwartz | B60W 30/0956 |
| 2019/0391580 A1* | 12/2019 | Di Cairano | G05D 1/0088 |

OTHER PUBLICATIONS

"A Context-Based Approach to Vehicle Behavior Prediction," Worrall, et al., IEEE Intelligent Transportation Systems Magazine, Sep. 2012.

* cited by examiner

MODELING GRAPH OF INTERACTIONS BETWEEN AGENTS

BACKGROUND

Field

Certain aspects of the present disclosure generally relate to controlling a behavior of a vehicle and, more particularly, to improving systems and methods for vehicle motion planning and decision-making based on a prediction system modeled on behaviors of agents in an environment.

Background

Autonomous vehicles and semi-autonomous vehicles perform various tasks based on agents, such as vehicles and pedestrians, within a vicinity of the vehicle. These tasks may include motion planning, turn-taking behaviors, social interactions with the other agents, and collision avoidance. Conventional systems perform the aforementioned tasks based on the predicted trajectories of surrounding agents.

Still, agents surrounding the vehicle may not follow a predicted trajectory. For example, a vehicle operated by a human may have an unpredictable trajectory based on the operator's driving style. As another example, a trajectory of a vehicle may be influenced by environmental constraints, such as a stop sign or turn signal. To account for variations in trajectories, conventional systems use complex prediction models to predict trajectories and perform tasks based on the predicted trajectories.

The complexity of prediction models may be reduced by modeling relationships that correlate with behaviors of surrounding agents rather than trajectories of agents. Modeling relationships that correlate with behaviors may also improve tasks such as motion planning, turn-taking behaviors, social interactions with the other agents, and collision avoidance. Aspects of the present disclosure are directed to predicting behaviors of agents based on modeled relationships that correlate with behaviors of agents.

SUMMARY

In one aspect of the present disclosure, a method for configuring a behavior for a subject vehicle is disclosed. The method includes observing a first behavior of an agent during a first time period. The method also includes estimating a first set of behavioral constraints followed by the agent based on the observed first behavior. The method further includes observing a second behavior of the agent during a second time period. The method still further includes determining whether the agent is behaving in accordance with the first set of behavioral constraints based on the second behavior. The method also includes adjusting the first set of behavioral constraints when the agent is not operating in accordance with the estimated set of behavioral constraints. The method further includes adjusting the behavior of the subject vehicle based on the adjusted first set of estimated behavioral constraints.

In another aspect of the present disclosure, a non-transitory computer-readable medium with non-transitory program code recorded thereon is disclosed. The program code is for configuring a behavior for a subject vehicle. The program code is executed by a processor and includes program code to observe a first behavior of an agent during a first time period. The program code also includes program code to estimate a first set of behavioral constraints followed by the agent based on the observed first behavior. The program code further includes program code to observe a second behavior of the agent during a second time period. The program code still further includes program code to determine whether the agent is behaving in accordance with the first set of behavioral constraints based on the second behavior. The program code also includes program code to adjust the first set of behavioral constraints when the agent is not operating in accordance with the estimated set of behavioral constraints. The program code further includes program code to adjust the behavior of the subject vehicle based on the adjusted first set of estimated behavioral constraints.

Another aspect of the present disclosure is directed to an apparatus for configuring a behavior for a subject vehicle. The apparatus having a memory and one or more processors coupled to the memory. The processor(s) is configured to observe a first behavior of an agent during a first time period. The processor(s) is also configured to estimate a first set of behavioral constraints followed by the agent based on the observed first behavior. The processor(s) is further configured to observe a second behavior of the agent during a second time period. The processor(s) still further configured to determine whether the agent is behaving in accordance with the first set of behavioral constraints based on the second behavior. The processor(s) is also configured to determine whether the agent is behaving in accordance with the first set of behavioral constraints based on the second behavior. The processor(s) is further configured to adjust the behavior of the subject vehicle based on the adjusted first set of estimated behavioral constraints.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
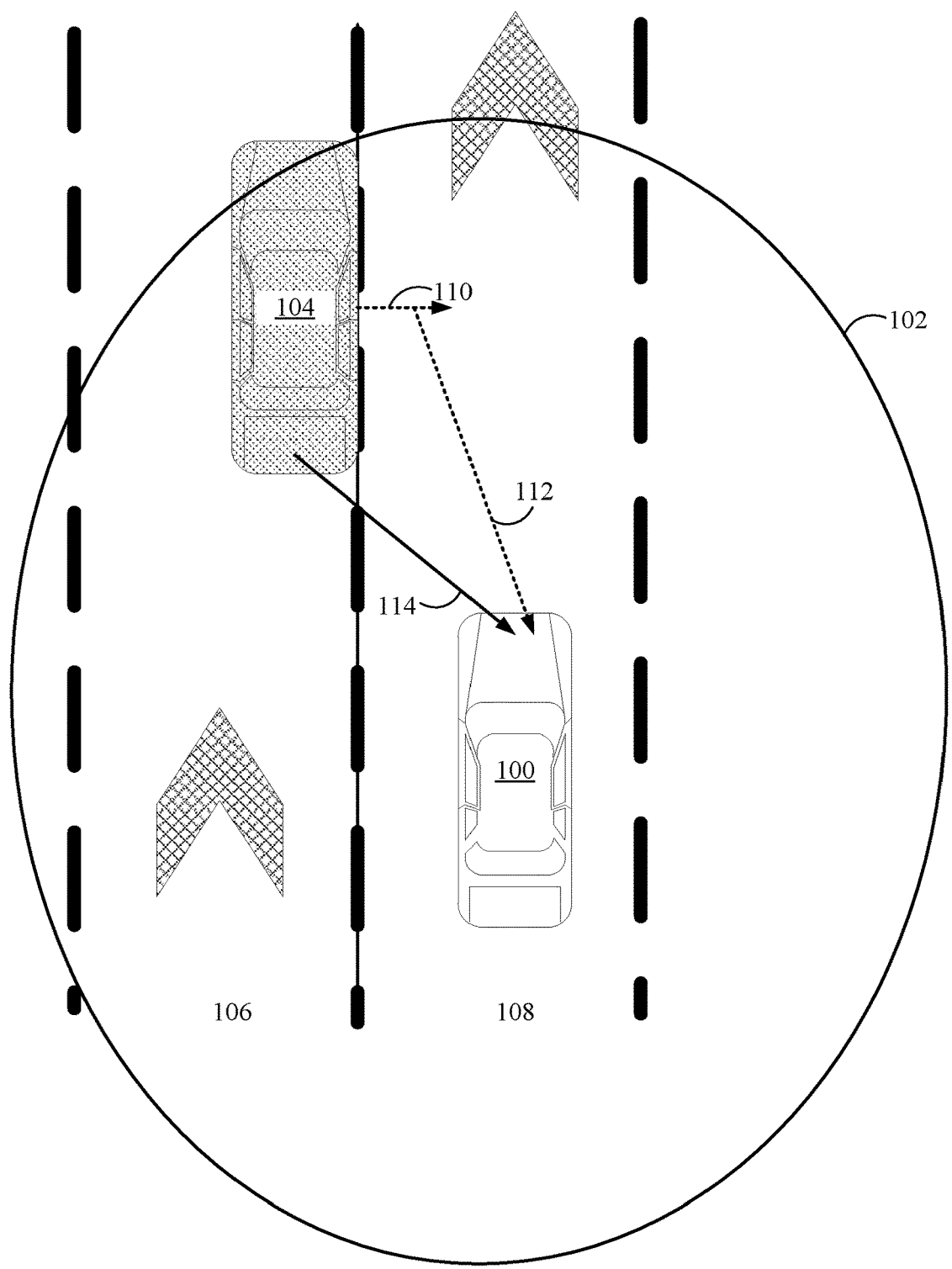
FIGS. 1, 2, 3, and 4 illustrate examples of controlling actions of a subject vehicle based on an observed behavior of one or more agents according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure, rather than limiting the scope of the disclosure being defined by the appended claims and equivalents thereof.

An action of autonomous vehicles and semi-autonomous vehicles may be controlled or adjusted based on predicted actions (e.g., behaviors) of surrounding agents, such as vehicles and pedestrians. For example, a trajectory may be planned for an autonomous vehicle based on the predicted actions of surrounding agents. As another example, the trajectory may be adjusted to avoid a collision based on the predicted actions of surrounding agents. The trajectory refers to a local motion plan, such as "drive along a particular path while smoothly accelerating to speed X." In the present application, unless otherwise noted, a vehicle refers to an autonomous vehicle or a semi-autonomous vehicle.

Conventional vehicles are controlled based on predicted trajectories of surrounding agents. The trajectories of surrounding agents may be predicted using Markov chains, or other probabilistic approaches, to provide a low-level prediction of movements. The trajectories predict where an agent may travel from a current time to a future time.

Conventional vehicle prediction modeling is performed on a per-agent basis. Therefore, conventional agent prediction modeling is difficult to scale and analyze. For example, when a subject vehicle is surrounded by multiple agents, the complexity of the model increases due to the number of vehicles. Additionally, the accuracy of the predicted trajectories decreases due to the increased number of agents and the increased number of potential trajectories.

To reduce model complexity and to improve predictions of an agent's action, it is desirable to model interactions between agents in an environment. The modeled interactions may be used to predict behaviors and analyze contingencies based on predicted behaviors. Contingencies account for instances when an agent does not behave according to a predicted behavior.

By using a behavior-centric approach, aspects of the present disclosure capture interrelationships between different agents. In contrast to conventional prediction modeling that only provides trajectories, the current behavior prediction system may predict behaviors. The behaviors may include, for example, determinations about whether an agent is stopping at a stop sign, yielding at an on-ramp, changing lanes, or crossing an intersection. Thus, aspects of the present disclosure provide an increased level of abstraction and granularity in comparison to conventional prediction modeling. The behavior prediction system may be referred to as a prediction system.

Furthermore, the modeled interactions (e.g., behavior-centric approach) may also reduce overly conservative behaviors of the vehicle. For example, in conventional systems, the vehicle may wait at a yield sign because the vehicle does not expect the agents to make room for the vehicle. In contrast, by modeling interactions, the time at a yield sign may be reduced if the vehicle determines, based on the agent's actions, that the agent will make room for the vehicle.

In the present application, the subject vehicle refers to an autonomous vehicle or a semi-autonomous vehicle. The agents refer to physical objects with the ability to move in an environment. The agents are in a specific vicinity of the subject vehicle. As an example, agents include pedestrians, vehicles, animals, bicyclists, or other moving objects. The predicted behaviors of the agents may be used to control the subject vehicle. For example, the predicted behaviors may be used for motion planning and/or decision-making for the subject vehicle.

The subject vehicle may be in communication with one or more sensors, such as a red-green-blue (RGB) camera, a light detection and ranging (LIDAR) sensor, and/or other types of sensors. The sensors may be defined on the subject vehicle or in proximity to the subject vehicle. The sensors may provide a 360° view of the subject vehicle's surroundings. An agent observed by the sensors may also be referred to as a target object.

Aspects of the present disclosure may be applied to predicting behaviors of extrinsic aspects (e.g., agents) or intrinsic aspects (e.g., the subject vehicle). With regard to the intrinsic aspects, when in a semi-autonomous mode (e.g., guardian mode), the subject vehicle may be controlled by a human operator. In this example, the prediction system may observe behaviors (e.g., actions) of the subject vehicle and predict one or more behaviors based on the observed actions. For example, the observed behaviors may include one or more of the vehicle's speed, activated turn signals, and/or the vehicle's path. In one configuration, the prediction system intervenes with the manual operation of the subject vehicle if the predicted behavior may cause a collision or violate an environmental constraint (e.g., traffic law).

In one configuration, the prediction system considers behavioral constraints when predicting future behavior. Behavioral constraints are based on constraints of a current environment, such as, for example, local driving norms, driving rules, other objects in an environment, as well as other factors. As an example, when an agent is observed on a freeway for a time period, the prediction system estimates that the agent will abide by constraints (e.g., contingencies) defined in a set of behavioral constraints based on the current environment. In this example, a set of behavioral constraints may include a first constraint that the agent will observe a posted speed limit, a second constraint that the agent will maintain a specific distance between cars, and a third constraint that the agent will avoid objects on the road.

FIG. 1 illustrates an example of controlling actions of a subject vehicle 100 based on an observed behavior of an agent vehicle 104 according to aspects of the present disclosure. As shown in FIG. 1, the subject vehicle 100 may observe the agent vehicle 104 within the subject vehicle's 100 field of view 102. The field of view 102 may be established by one or more sensors (not shown) that are in communication with the subject vehicle 100. The sensors may include one or more of an RGB camera, a LIDAR sensor, and/or other sensors.

In the example of FIG. 1, the subject vehicle 100 observes the agent vehicle 104 is beginning to travel in a path 110 from the agent vehicle's current lane 106 to the subject vehicle's lane 108. The observed behavior may be used to predict the agent vehicle's 104 future behavior along the path 110. In this example, the agent vehicle's 104 predicted movement along the path 110 to the subject vehicle's lane 108 is one behavior used to predict the agent vehicle's 104 future behavior. Other behaviors may include a reduction in speed, an increase in speed, or an active turn signal.

In the present example, the agent vehicle's 104 path 110 may be considered a hypothesized constraint 112 for the subject vehicle 100. The hypothesized constraint 112 is evaluated by the subject vehicle 100 as a possible future constraint. The subject vehicle 100 is also constrained by observed constraints of other agents. When controlling the subject vehicle's 100 trajectory (e.g., behavior) the observed constraints may be given more weight than the hypothesized constraints.

As shown in FIG. 1, there is a one-way constraining relationship 114 between the agent vehicle 104 and the subject vehicle 100, whereby the subject vehicle's 100 behavior is constrained by the one-way constraint 114. That is, the subject vehicle's 100 behavior is constrained based on the observed behaviors of the agent vehicle 104. The observed behaviors may include the agent vehicle's 104 speed, direction of travel, vehicle type, as well as other observed behavior. Additionally, in FIG. 1, there is also a one-way hypothesized constraining relationship 112 between the agent vehicle's 104 predicted behavior and the subject vehicle 100, such that the subject vehicle's 100 behavior may also be constrained based on the agent vehicle's 104 predicted behavior.

In this example, the prediction system predicts that the agent vehicle 104 is performing a lane change. Based on the observed behavior and the predicted behavior of the agent vehicle 104, the prediction system also estimates that the agent vehicle 104 will follow a set of behavioral constraints corresponding to the lane change. The set of behavioral constraints corresponding to the lane change may include a first constraint that the agent vehicle 104 will maintain a specific distance from the subject vehicle 100 and a second constraint that the agent vehicle 104 will maintain a speed in a specific range.

Furthermore, based on the observed behavior and the predicted behavior of the agent vehicle 104, the prediction system constrains behaviors (e.g., actions) of the subject vehicle 100 to a set of behaviors from a behavior graph. For example, the subject vehicle's 100 behavior may be constrained to the set of behavioral constraints corresponding to a merging vehicle. The set of behavioral constraints corresponding to the merging vehicle may include a constraint that the subject vehicle 100 will maintain a specific distance from the agent vehicle 104. In this example, sensors of the agent vehicle 104 may also observe the subject vehicle 100. Accordingly, the agent vehicle 104 may also estimate that the subject vehicle 100 will behave according to a set of behavioral constraints.

Figure 2:
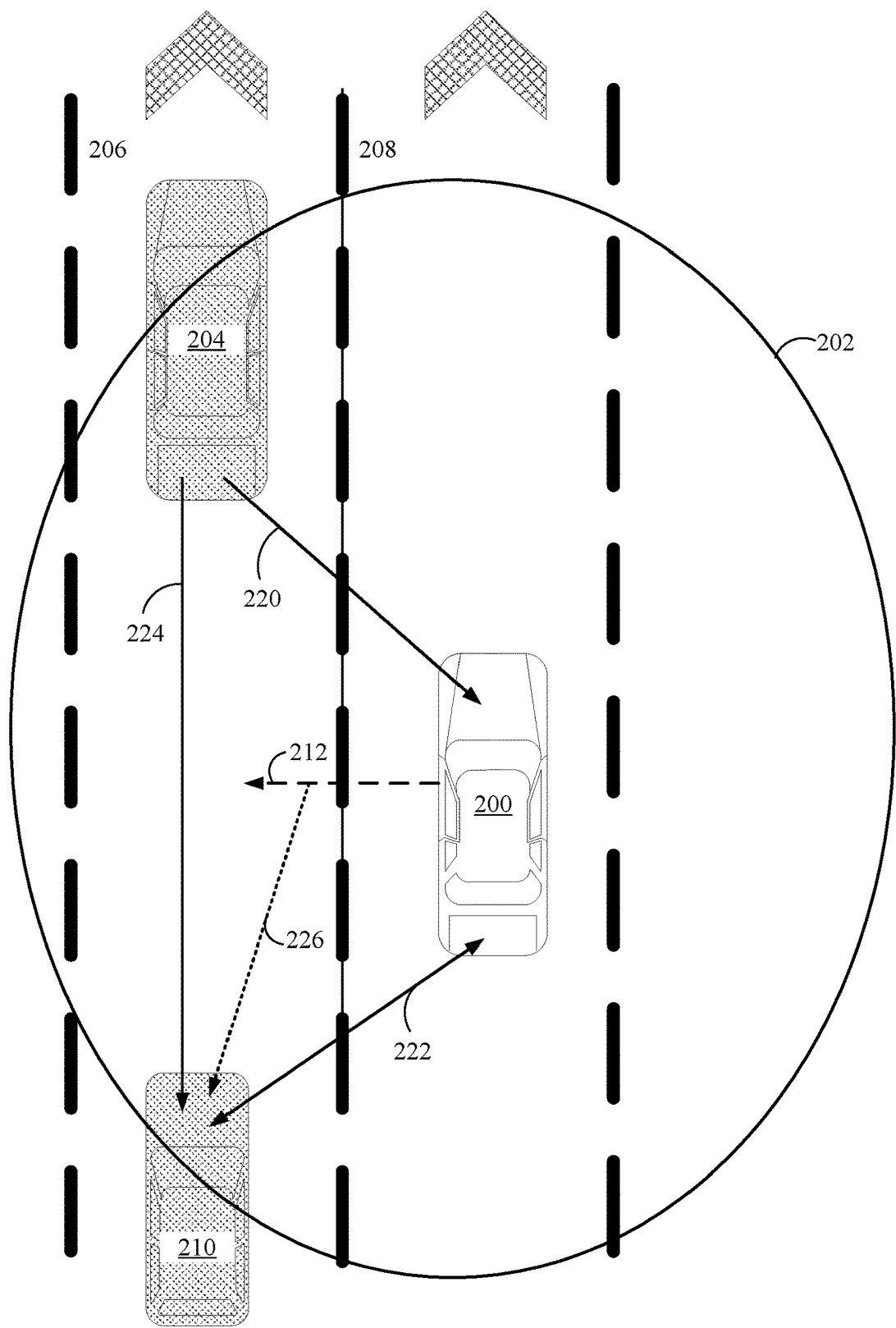

FIG. 2 illustrates an example of controlling actions of a subject vehicle 200 based on observed interrelationships between different agent vehicles 204, 210 according to aspects of the present disclosure. As shown in FIG. 2, the subject vehicle 200 may observe a first agent vehicle 204 and a second agent vehicle 210 within the subject vehicle's 200 field of view 202. The field of view 202 may be established by one or more sensors (not shown) that are in communication with the subject vehicle 200.

In the example of FIG. 2, the subject vehicle 200 traveling in a subject vehicle lane 208 may attempt to follow a path 212 to merge between the first agent vehicle 204 and the second agent vehicle 210 traveling in an agent vehicle lane 206. Each vehicle 200, 204, 210 may include one or more sensors for observing surrounding objects. Additionally, or alternatively, a human operator may also perform observations.

In FIG. 2, the first agent vehicle 204 may not generate a set of behavioral constraints because it is ahead of the subject vehicle 200 and does not need to limit its behavior. That is, in the example of FIG. 2, there is a first one-way constraining relationship 220 between the agent vehicle 204 and the subject vehicle 200, whereby the subject vehicle's 200 behavior is constrained based on the first one-way constraining relationship 220. For example, the subject vehicle's 200 behavior is constrained based on the behavior of the first agent vehicle 204.

Furthermore, there is a second two-way constraining relationship 222 between the agent vehicle 204 and the subject vehicle 200, whereby both the subject vehicle's 200 behavior and the second agent vehicle's 210 behavior are constrained based on the second two-way constraining relationship 222. Specifically, the subject vehicle's 200 behavior is constrained based on the behavior of the second agent vehicle 210. Likewise, the second agent vehicle's 210 behavior is constrained based on the behavior of the subject vehicle 200. Additionally, a third one-way relationship 224 exists between the first agent vehicle 204 and the second agent vehicle 210. Whereby, the second agent vehicle's 210 behavior is constrained based on the behavior of the first agent vehicle 204. Finally, in FIG. 2, there is also a one-way hypothesized constraining relationship 226 between the subject vehicle's 200 predicted behavior and the second agent vehicle 210, such that the second agent vehicle's 210 behavior may also be constrained based on the subject vehicle's 200 predicted behavior.

Based on the observed behavior of the subject vehicle 200, the second agent vehicle 210 adjusts its set of behavioral constraints according to the estimated set of behavioral constraints of the subject vehicle 200. The estimated set of behavioral constraints may include the one-way hypothesized constraining relationship 226, the third one-way relationship 224, and the two-way constraining relationship 222. For example, a prediction system of the second agent vehicle 210 may predict that the subject vehicle 200 is merging into the gap between the first agent vehicle 204 and the second agent vehicle 210. Thus, the second agent vehicle 210 adjusts its set of behavioral constraints to consider a merging vehicle (e.g., subject vehicle 200) while also considering that the first agent vehicle 204 is in front of the second agent vehicle 210. For example, based on the updated set of behavioral constraints, the second agent vehicle 210 may maintain a distance from the first agent vehicle 204 while also providing space for the subject vehicle 200 to merge.

Finally, based on the observed behaviors of the first agent vehicle 204 and the second agent vehicle 210, the prediction system estimates that the first agent vehicle 204 and the second agent vehicle 210 will follow a set of behavioral constraints corresponding to two cars traveling in the same lane, such as providing space for the subject vehicle 200 to merge. Furthermore, based on the observed behaviors of the first agent vehicle 204 and the second agent vehicle 210, the prediction system constrains behaviors (e.g., actions) of the subject vehicle 200 to a set of behaviors from a behavior graph. For example, the subject vehicle's 200 behavior may be constrained to the set of behavioral constraints corresponding to merging between two vehicles 204, 210. The set of behavioral constraints corresponding to the merging between two vehicles 204, 210 may include a first constraint that the subject vehicle 200 will maintain a specific distance from both vehicles 204, 210.

The examples of FIGS. 1 and 2 are based on the vehicles (e.g., agent vehicles and subject vehicle) sharing constraints. By sharing constraints, each vehicle may reason how other vehicles will behave. A behavior graph may be formed based on the shared constraints such that a behavior function traverses the graph when formulating behaviors for the subject vehicle and estimating behaviors of agents. The behavior graph may also be used to identify salient agents. That is, based on observed and predicted behaviors of one or more agents, the behavior graph may indicate that one or more agents should be more closely tracked than other agents.

In another example, the subject vehicle may have limited or reduced computational resources, such as memory or processing power. Based on the limited or reduced computational resources, the subject vehicle may be limited in the number of agents that can be tracked. Therefore, the subject vehicle may limit the tracking of agents to important agents. Important agents may be agents that pose an imminent risk to the subject vehicle or agents that are not following a set of behavioral constraints. The important agents may be identified from the behavior graph.

Figure 3:
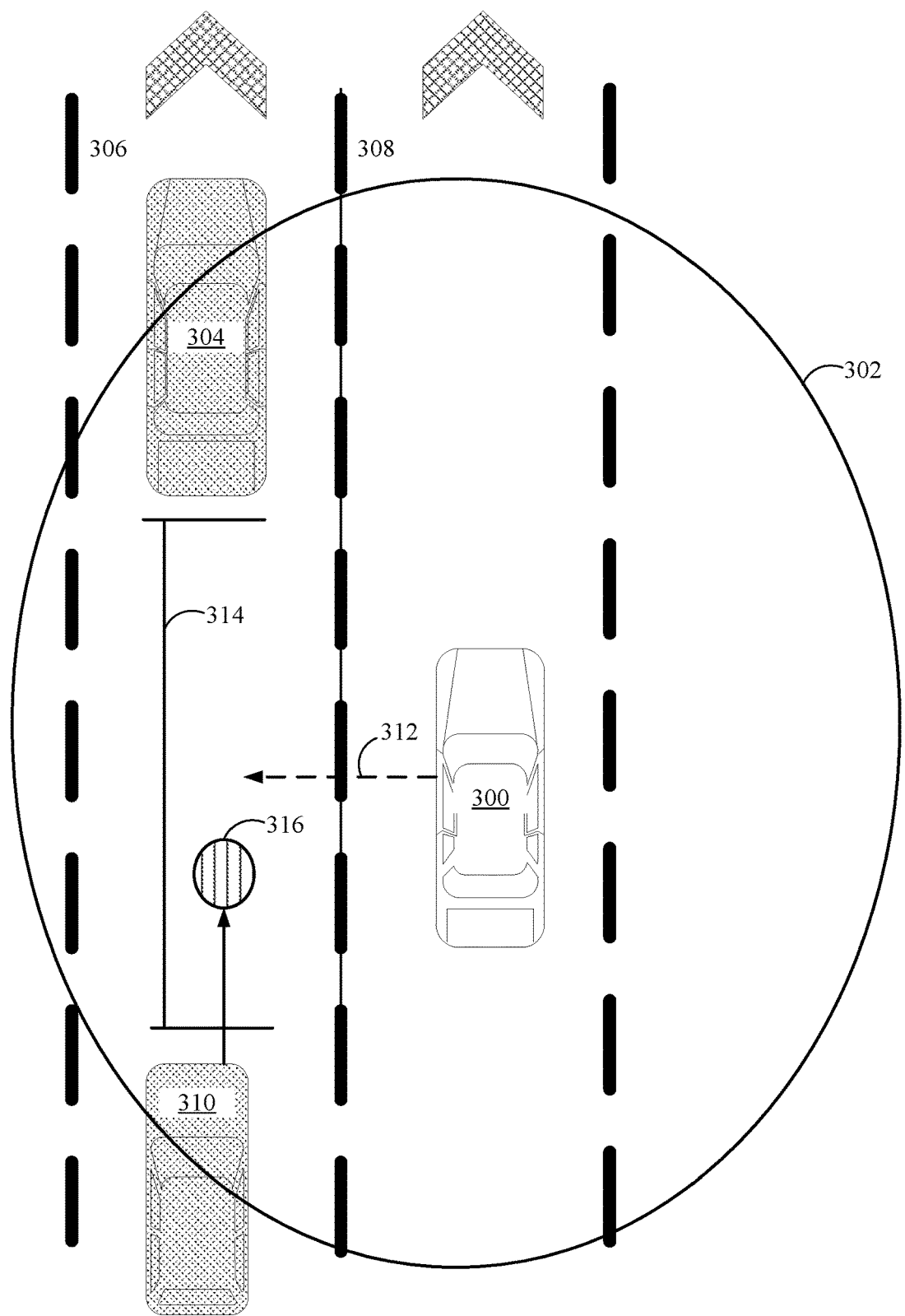

The behavior graph may also be used for contingency planning. Contingency planning may be used to determine one or more behaviors for the subject vehicle in the event that an agent violates a constraint in a set of behavioral constraints estimated for the agent. FIG. 3 illustrates an example of contingency planning according to aspects of the present disclosure. As shown in FIG. 3, the subject vehicle 300 may observe a first agent vehicle 304 and a second agent vehicle 310 within the subject vehicle's 300 field of view 302. The subject vehicle 300 traveling in a subject vehicle lane 308 may attempt to merge between the first agent vehicle 304 and the second agent vehicle 310 traveling in an agent vehicle lane 306. For brevity, the example of FIG. 3 does not illustrate the one-way and two-way constraining relationships.

Based on the observed behaviors of the first agent vehicle 304 and the second agent vehicle 310, the prediction system estimates that the first agent vehicle 304 and the second agent vehicle 310 will follow a set of behavioral constraints corresponding to two cars traveling in the same lane. For example, the set of behavioral constraints may include a constraint that the second agent vehicle 310 will maintain a gap 314 between the first agent vehicle 304.

However, in some cases, the second agent vehicle 310 may violate one or more constraints of the set of behavioral constraints. For example, the second agent vehicle 310 may move to a location 316 within the gap 314 during, or prior to, a merge by the subject vehicle 300. If the second agent vehicle 310 moves to the location 316 within the gap 314, the subject vehicle 300 cannot merge or a collision will occur. Accordingly, the subject vehicle 300 may plan for contingency behaviors should the second agent vehicle 310 violate the constraint of providing room for the subject vehicle 300 to merge.

Using the behavior graph, the prediction system of the subject vehicle 300 may determine objects in the environment that are constrained by the subject vehicle's 300 behavior. In the example of FIG. 3, because the first agent vehicle 304 is in front of the subject vehicle 300, the first agent vehicle 304 may not be constrained by the subject vehicle's 300 behavior. Thus, in the present example, only the second agent vehicle 310 is constrained by the subject vehicle's 300 behavior.

After determining that the second agent vehicle 310 is constrained by the subject vehicle's 300 behavior, the subject vehicle 300 may simulate possible contingent behaviors and their likely outcomes by traversing the behavior graph. For example, the subject vehicle 300 may determine that a collision may occur if it continues to follow a merging path 312 when the second agent vehicle 310 is in the gap 314. As another example, the subject vehicle 300 may determine that a collision may be avoided if the subject vehicle 300 slows down and merges behind the second agent vehicle 310. By traversing the behavior graph, the subject vehicle 300 may analyze multiple contingent behaviors and select contingent behaviors in the event of a constraint violation.

As discussed above, the behavior graph may be used to generate simulations (e.g., behavior hypotheses) for various situations, and also when a constraint is changed, violated, or removed. That is, the behavior graph provides an analysis of interactions between agents, such that a behavior function may identify contingency behaviors. As previously discussed, based on an observed behavior of an agent and surrounding objects, the prediction system generates a probabilistic determination of the agent's current behavior and estimated future behavior. The graph may be populated with constraints corresponding to the determined current behavior and estimated future behavior.

In one configuration, the behavior graph is used to generate simulations when the other vehicle's actions are ambiguous. In another configuration, the behavior graph is used to generate simulations (e.g., perform contingency analysis) to determine whether the addition or removal of a possible constraint could yield a collision or other safety hazard. For example, when merging in front of an agent vehicle, it is beneficial to know if the agent vehicle is yielding to the subject vehicle. In this example, the agent vehicle may or may not have a behavioral constraint for yielding to the subject vehicle. Therefore, to improve safety, it is desirable to perform the contingency analysis. That is, a collision or near-miss may occur if the subject vehicle incorrectly predicts that the agent vehicle will yield. As such, it is desirable to identify contingency behaviors when there may be a possibility of a collision if there are no constraints for the subject vehicle and/or the agent.

Figure 4:
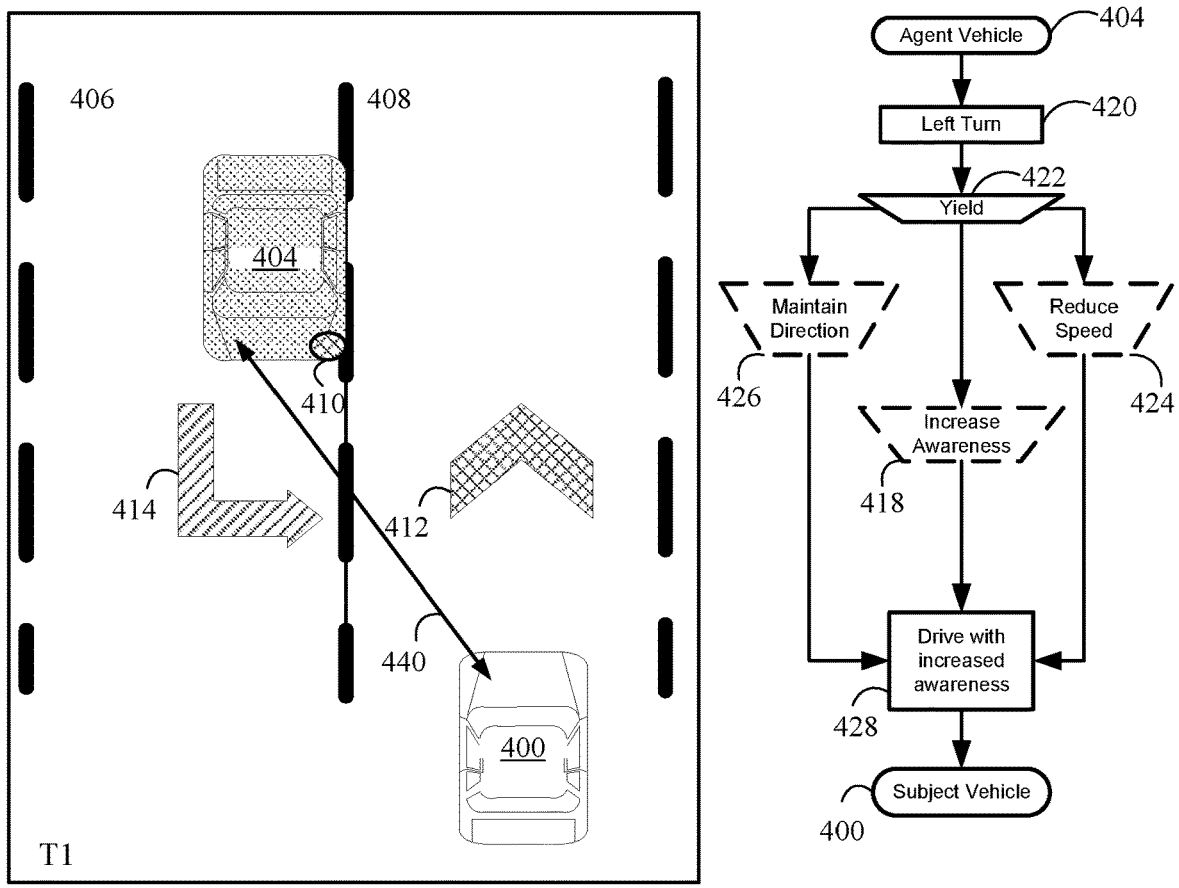
Figure 4:
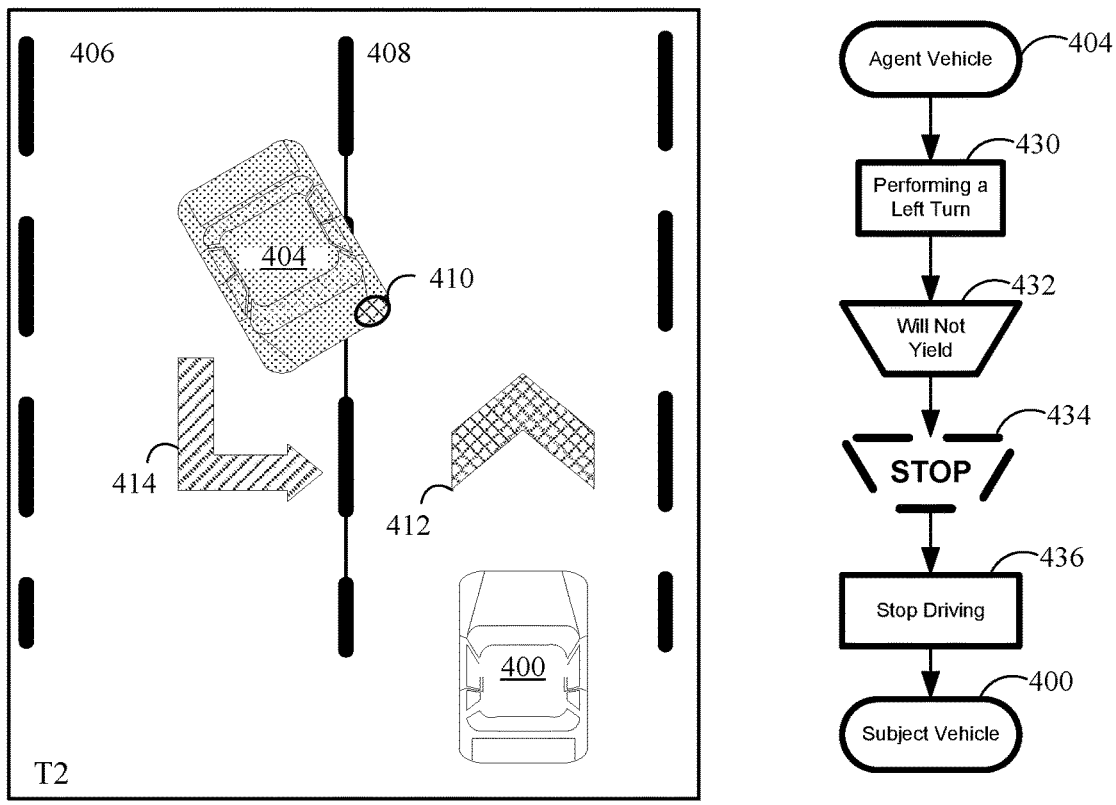

FIG. 4 illustrates an example of updating a set of behavioral constraints based on observed behavior according to aspects of the present disclosure. As shown in FIG. 4, at time T1, a subject vehicle 400 is driving in a first direction 412 on a first lane 408. Additionally, at time T1, the subject vehicle 400 observes an agent vehicle 404 stopped in a left turn lane 406 that is adjacent to the first lane 408. The left turn lane 406 may be distinguished by a left turn arrow 414. The agent vehicle 404 is facing a direction opposite of the first direction 412 and the agent vehicle's 404 left turn blinker 410 is activated.

In the example of FIG. 4, a two-way constraining relationship 440 exists between the subject vehicle 400 and the agent vehicle 404. In this example, the subject vehicle 400 may wait to determine whether the agent vehicle 404 yields or makes the left turn. If the agent vehicle 404 yields, the subject vehicle 400 determines that the agent vehicle also includes a behavioral constrain. Otherwise, the subject vehicle 400 determines that the agent vehicle 400 does not have a behavioral constrain with regard to yielding to oncoming traffic.

The left turn arrow 414, agent vehicle 404, and activated left turn blinker 410 may be in the subject vehicle's field of view and may be observed by one or more sensors of the subject vehicle 400. Based on the observed behaviors (e.g., agent vehicle 404 stopped in the left turn lane 406 and activated left turn blinker 410) and environmental constraints (e.g., left turn arrow 414), at block 420, the prediction system of the subject vehicle 400 may provide a probabilistic determination that the agent vehicle 404 will be making a left turn. That is, the prediction system predicts that there is an increased probability that the agent vehicle 404 is intending to make a left turn.

Based on the estimated future behavior of the agent vehicle 404, the prediction system estimates a set of behavioral constraints for the agent vehicle 404. In this example, the estimated set of behavioral constraints includes a constraint that the agent vehicle 404 will yield to oncoming traffic prior to turning (block 422). The constraints in the set of behavioral constraints of the agent vehicle 404 are not limited to yielding. Other constraints are also contemplated.

In response to estimating the set of behavioral constraints of the agent vehicle 404, the prediction system determines or updates (e.g., adjusts) a set of behavioral constraints of the subject vehicle 400. In this example, the set of behavioral constraints includes a first constraint that the subject vehicle 400 should maintain its current direction 412 (block 426), a second constraint that the subject vehicle 400 should reduce its current speed (block 424), and a third constraint that the subject vehicle 400 should increase the tracking of the agent vehicle (block 418).

At block 428, a behavior of the subject vehicle 400 is updated based on the updated set of constraints. In this example, the updated behavior includes driving with increased awareness. The prediction system may have been trained, or pre-set, to know that left turns into oncoming traffic pose an imminent threat. Thus, based on the predicted behavior, the agent vehicle is a salient object that should be tracked with increased awareness (e.g., scrutiny).

After time T1, at time T2, the subject vehicle 400 observes a behavior of the agent vehicle 404. As shown in FIG. 4, at time T2, the agent vehicle 404 has initiated the left turn. Based on the newly observed behavior (e.g., initiating a left turn) of the agent vehicle 404, at block 430, the prediction system predicts that the agent vehicle 404 is performing a left turn. Based on the observed behavior, the prediction system determines that the agent vehicle 404 is not abiding by the initial set of behavioral constraints (e.g., yielding to oncoming traffic prior to turning).

Because the agent vehicle 404 is violating the initial estimated set of constraints, the prediction system adjusted the estimated set of behavioral constraints to correspond with the updated behavior prediction. In this example, a constraint of the adjusted set of behavioral constraints of the agent vehicle 404 is that the agent vehicle will not yield to oncoming traffic (block 432).

In response to the adjusted set of behavioral constraints of the agent vehicle 404, the prediction system may also adjust the subject vehicle's 400 set of behavioral constraints. At block 434, the prediction system adjusts its behavioral constraint to include a constraint that the subject vehicle 400 should stop. The behavior of the subject vehicle 400 may be updated in response to the updated set of behavioral constraints. At block 436, based on the updated set of behavioral constraints (block 434), the subject vehicle 400 stops driving to avoid a collision with the agent vehicle.

The subject vehicle 400 may continuously monitor its surroundings to update the set of behavioral constraints. In another configuration, the surroundings may be periodically monitored according to a set interval. Should two or more agents be present in an environment, the subject vehicle's 400 set of behavioral constraints are updated based on the predicted behaviors and estimated set of behavioral constraints of each agent.

As discussed above, the estimated set of behavioral constraints are based on the assumption that agents follow rules in accordance with driving norms and environmental constraints. For example, the prediction system may assume that an agent travels within a certain range of the speed limit. The range may be bounded by a speed that is greater than and less than the posted speed limit. Constraints may be violated for various reasons. For example, a human operator may disregard driving rules, the subject vehicle may not observe one or more environmental constraints, the agent may malfunction, or other reasons. Aspects of the present disclosure improve the operation of vehicles by predicting interactions of various agents and updating actions of the subject vehicle based on predicted behaviors. The updated actions may be based on estimated behavioral constraints that are updated based on each observed behavior.

Figure 5:
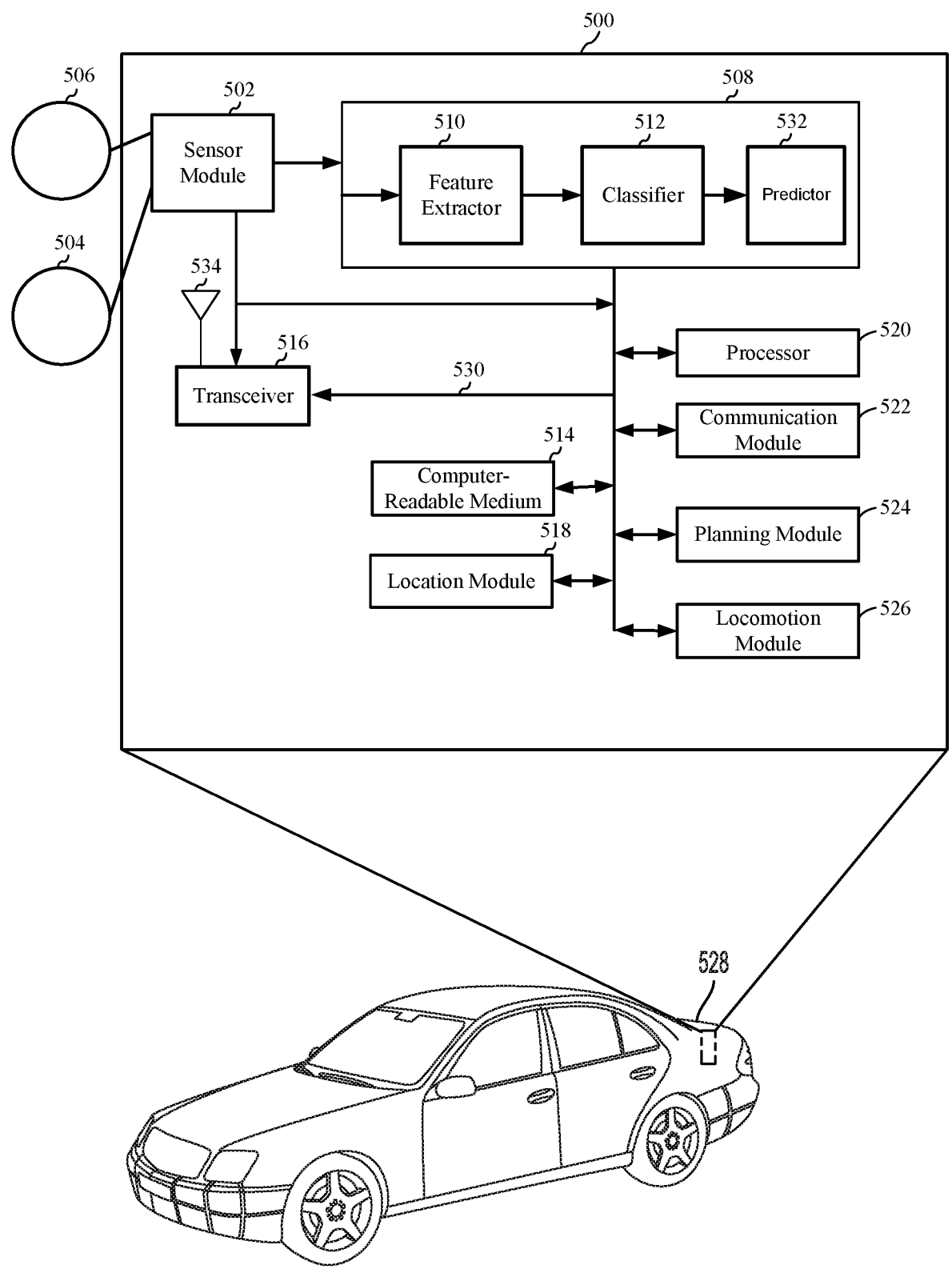
FIG. 5 is a diagram illustrating an example of a hardware implementation for a behavior prediction system according to aspects of the present disclosure.

FIG. 5 is a diagram illustrating an example of a hardware implementation for a behavior prediction system 500 according to aspects of the present disclosure. The behavior prediction system 500 may be a component of a vehicle, a robotic device, or other device. For example, as shown in FIG. 5, the behavior prediction system 500 is a component of a car 528. Of course, aspects of the present disclosure are not limited to the behavior prediction system 500 being a component of the car 528, as other devices, such as a bus, boat, drone, or robot, are also contemplated for using the behavior prediction system 500.

The behavior prediction system 500 may be implemented with a bus architecture, represented generally by a bus 530. The bus 530 may include any number of interconnecting buses and bridges depending on the specific application of the behavior prediction system 500 and the overall design constraints. The bus 530 links together various circuits including one or more processors and/or hardware modules, represented by a processor 520, a communication module 522, a location module 518, a sensor module 502, a locomotion module 526, a planning module 524, and a computer-readable medium 514. The bus 530 may also link various other circuits such as timing sources, peripherals, voltage regulators, and power management circuits, which are well known in the art, and therefore, will not be described any further.

The behavior prediction system 500 includes a transceiver 516 coupled to the processor 520, the sensor module 502, an artificial neural network module 508, the communication module 522, the location module 518, the locomotion module 526, the planning module 524, and the computer-readable medium 514. The transceiver 516 is coupled to antennae 534. The transceiver 516 communicates with various other devices over a transmission medium. For example, the transceiver 516 may receive commands via transmissions from a user or a remote device. As another example, the transceiver 516 may transmit driving statistics and information from the artificial neural network module 508 to a server (not shown).

The behavior prediction system 500 includes the processor 520 coupled to the computer-readable medium 514. The processor 520 performs processing, including the execution of software stored on the computer-readable medium 514 providing functionality according to the disclosure. The software, when executed by the processor 520, causes the behavior prediction system 500 to perform the various functions described for a particular device, such as the car 528, or any of the modules 502, 508, 514, 516, 518, 520, 522, 524, 526. The computer-readable medium 514 may also be used for storing data that is manipulated by the processor 520 when executing the software.

The sensor module 502 may be used to obtain measurements via different sensors, such as a first sensor 506 and a second sensor 504. The first sensor 506 may be a vision sensor, such as a stereoscopic camera or an RGB camera, for capturing 2D images. The second sensor 504 may be a ranging sensor, such as a light detection and ranging (LIDAR) sensor or a radio detection and ranging (RADAR) sensor. Of course, aspects of the present disclosure are not limited to the aforementioned sensors as other types of sensors, such as, for example, thermal, sonar, and/or lasers are also contemplated for either of the sensors 504, 506. The measurements of the first sensor 506 and the second sensor 504 may be processed by one or more of the processor 520, the sensor module 502, the artificial neural network module 508, the communication module 522, the location module 518, the locomotion module 526, the planning module 524, in conjunction with the computer-readable medium 514 to implement the functionality described herein.

As previously discussed, the measurements from the first sensor 506 may be used to capture 2D images. Furthermore, the measurements from the second sensor 504 may be used for depth measurements. In one configuration, the data captured by the first sensor 506 and the second sensor 504 may be transmitted to an external device via the transceiver 516. The first sensor 506 and the second sensor 504 may be coupled to the car 528 or may be in communication with the car 528.

The location module 518 may be used to determine a location of the car 528. For example, the location module 518 may use a global positioning system (GPS) to determine the location of the car 528. The communication module 522 may be used to facilitate communications via the transceiver 516. For example, the communication module 522 may be configured to provide communication capabilities via different wireless protocols, such as WiFi, long term evolution (LTE), 3G, etc. The communication module 522 may also be used to communicate with other components of the car 528 that are not modules of the behavior prediction system 500.

The locomotion module 526 may be used to facilitate locomotion of the car 528. As an example, the locomotion module 526 may control movement of the wheels. As another example, the locomotion module 526 may be in communication with a power source of the car 528, such as an engine or batteries. Of course, aspects of the present disclosure are not limited to providing locomotion via wheels and are contemplated for other types of components for providing locomotion, such as propellers, treads, fins, and/or jet engines.

The behavior prediction system 500 also includes a planning module 524 for planning a trajectory or controlling the locomotion of the car 528, via the locomotion module 526, based on the analysis performed by the artificial neural network 508. In one configuration, the planning module 524 overrides the user input when the user input is expected (e.g., predicted) to cause a collision. The modules may be software modules running in the processor 520, resident/stored in the computer-readable medium 514, one or more hardware modules coupled to the processor 520, or some combination thereof.

The artificial neural network 508 may be in communication with the sensor module 502, the transceiver 516, the processor 520, the communication module 522, the location module 518, the locomotion module 526, the planning module 524, and the computer-readable medium 514. In one configuration, the artificial neural network 508 receives sensor data from the sensor module 502. The sensor module 502 may receive the sensor data from the first sensor 506 and the second sensor 504. According to aspects of the disclosure, the sensor module 502 may filter the data to remove noise, encode the data, decode the data, merge the data, extract frames, or perform other functions. In an alternate configuration, the artificial neural network 508 may receive sensor data directly from the first sensor 506 and the second sensor 504.

As shown in FIG. 5, the artificial neural network 508 (e.g., machine learning module) may include a feature extractor 510, a classifier 512, and a predictor 532. The feature extractor 510, the classifier 512, and the predictor 532 may be components of a same or different convolutional neural network (CNN), such as a deep CNN. The artificial neural network 508 is not limited to a CNN and may be another type of artificial neural network, such as a support vector machine (SVM). The feature extractor 510 receives a data stream from the first sensor 506 and the second sensor 504. The data stream may be data combined from the first sensor 506 and the second sensor 504. For example, the data stream may be a 2D RGB image from the first sensor 506 that is merged with LIDAR data points from the second sensor 504. In another configuration, the data stream is a separate stream from each sensor 504, 506. The data stream may include multiple frames, such as image frames.

The feature extractor 510 extracts (e.g., identifies) areas of interest from each frame of the data stream. For example, the feature extractor 510 may be trained to extract features of 3D objects. As another example, the feature extractor 510 may be trained to extract features of different terrains, such as roads, sidewalks, buildings, and background. That is, the feature exactor 510 identifies areas of attention based on the training. The artificial neural network 508 may include one or more feature extractors 510. For example, one feature extractor 510 may be configured to detect 3D objects and another feature extractor 510 may be configured to segment different elements of the data, such as roads, sidewalks, buildings, and background.

The classifier 512 receives the extracted features from the feature extractor 510 to classify the area of interest. The classifier 512 may be a classification segment of the CNN. The classifier 512 may be configured to draw a 3D bounding box around an area of interest, for example within a field of view, such as an object or agent. In another configuration, the classifier 512 determines a parametric representation of an area of interest, such as a road, or traffic lane. In yet another configuration, the classifier 512 may classify (e.g., label) one or more of the areas of interest.

The predictor 532 may receive the output from the classifier 512 to predict a behavior of an observed agent. The prediction may be based on training. Additionally, the prediction may be based on classified areas of interest from a sequence of frames. Based on the predicted behavior, the predictor 532 may also estimate a set of behavioral constraints of the agent. In another configuration, the artificial neural network 508 may output the predicted behavior determined by the predictor 532 to one or more of the sensor module 502, the transceiver 516, the processor 520, the communication module 522, the location module 518, the locomotion module 526, the planning module 524, and the computer-readable medium 514.

For example, the annotated data may output to the processor 520 to retrieve a set of behavioral constraints that correspond to the predicted behavior from the computer-readable medium 514 or planning module 524. Additionally, based on the set of behavioral constraints for the agent, one or more of the modules 502, 508, 514, 516, 518, 520, 522, 524, 526 may determine or update a set of behavioral constraints of the car 528. The planning module 524 may perform motion planning, decision-making, or other vehicular control functionality based on the set of behavioral constraints of the car 528.

Figure 6:
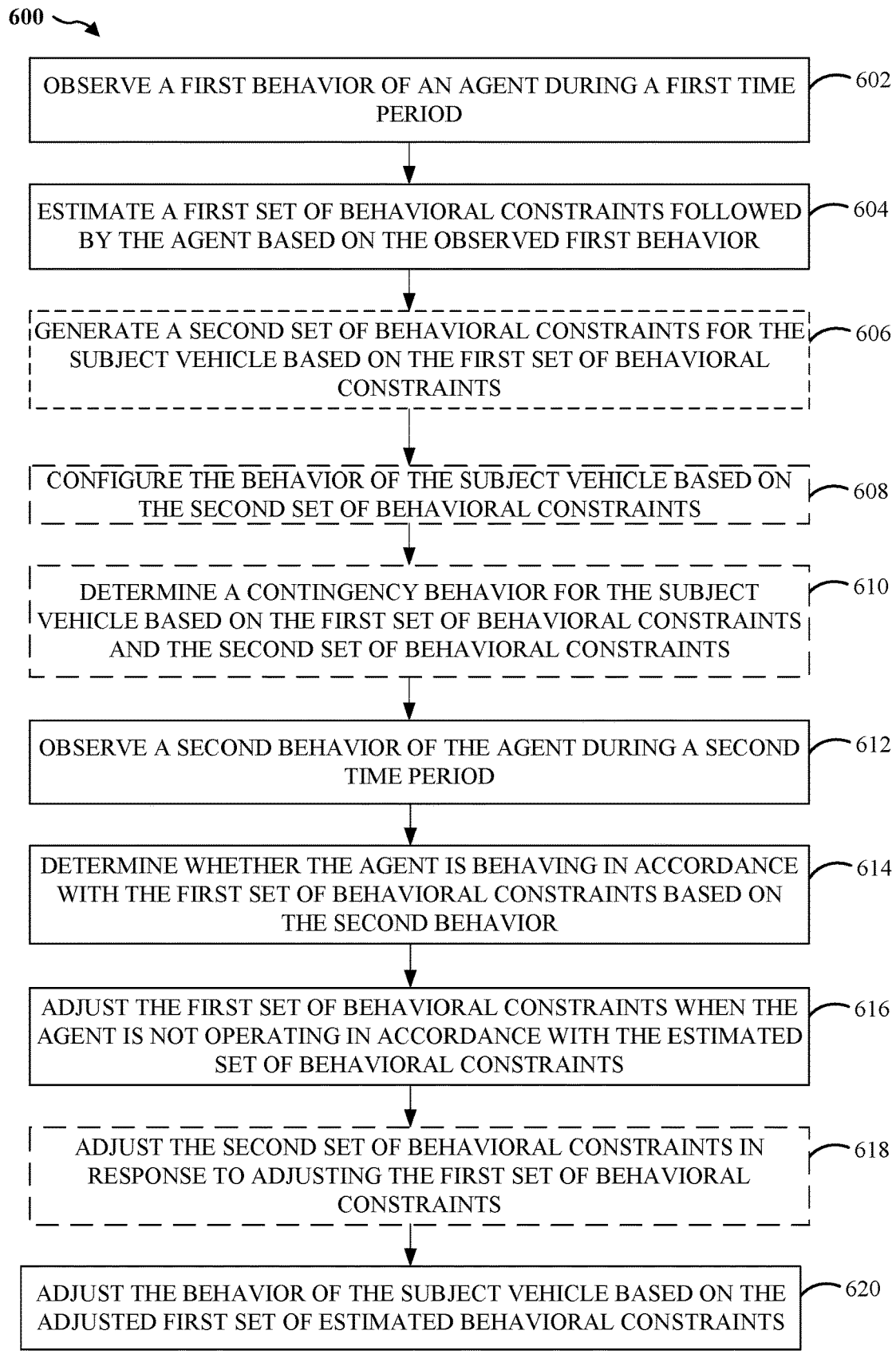
FIG. 6 illustrates a flow diagram for a method for configuring a behavior of an agent according to aspects of the present disclosure.

FIG. 6 illustrates a method 600 for configuring a behavior of an agent vehicle according to an aspect of the present disclosure. At block 602, the subject vehicle observes a first behavior of an agent during a first time period. The behavior may be observed by at least one of a red-green-blue (RGB) camera, a light detection and ranging (LIDAR) sensor, and/or another type of sensor. At block 604, the subject vehicle estimates a first set of behavioral constraints followed by the agent based on the observed first behavior.

In an optional configuration, at block 606, the subject vehicle generates a second set of behavioral constraints for the subject vehicle based on the first set of behavioral constraints. That is, the subject vehicle may set constrains for its behavior based on the estimated constraints of the agent. In another optional configuration, at block 608, the subject vehicle configures the behavior of the subject vehicle based on the second set of behavioral constraints. For example, the subject vehicle may reduce its speed, set a speed limit, limit lane changes, and/or configure one or more behaviors configuring the behavior of the subject vehicle based on the second set of behavioral constraints.

In yet another optional configuration, at block 610, the subject vehicle determines a contingency behavior for the subject vehicle based on the first set of behavioral constraints and the second set of behavioral constraints. The contingency behavior may provide contingencies in the event that the agent does not follow the estimated first set of behavioral constraints. For example, the contingencies may avoid a collision. In one example, the contingency behavior may be to stop moving if the agent is not following a behavioral constraint of yielding to oncoming traffic. That is, the behavior of the subject vehicle may be adjusted to the contingency behavior when the agent is not operating in accordance with the estimated set of behavioral constraints.

At block 612, the subject vehicle observes a second behavior of the agent during a second time period. The second time period may be subsequent to the first time period. At block 614, the subject vehicle determines whether the agent is behaving in accordance with the first set of behavioral constraints based on the second behavior. For example, if the first set of behavioral constraints included a speed limit behavioral constraint, the subject vehicle may determine whether the agent is following the speed limit behavioral constraint.

At block 616, the subject vehicle, adjusts the first set of behavioral constraints when the agent is not operating in accordance with the estimated set of behavioral constraints. For example, the subject vehicle may adjust the original estimated speed limit behavioral constraint to a new speed limit behavioral constraint. In an optional configuration, at block 618, the subject vehicle adjusts the second set of behavioral constraints in response to adjusting the first set of behavioral constraints. That is, the behavioral constraints of the subject vehicle may be adjusted. For example, the subject vehicle's speed limit may also be adjusted based on the adjusted behavioral constraint of the agent.

Finally, at block 620, the subject vehicle adjusts the behavior of the subject vehicle based on the adjusted first set of estimated behavioral constraints. For example, if the agent is not following an estimated speed limit behavioral constraint, the subject vehicle may reduce its speed limit or change lanes to avoid being near the speeding agent. The agent may be a vehicle, a pedestrian, a cyclist, or other type of agent that may be in a vehicle's environment.

The various operations of methods described above may be performed by any suitable means capable of performing the corresponding functions. The means may include various specially configured hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a specially configured processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A specially configured processor may be a microprocessor, but in the alternative, the processor may be a commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. A method for configuring a behavior for a subject vehicle, comprising:
   predicting a future behavior of an agent based on a first behavior of the agent observed during a first time period;
   selecting, based on the observed first behavior, a first set of rules predicted to be followed by the agent when performing the future behavior, the first set of rules selected from a plurality of rules followed by the subject vehicle, and the plurality of rules providing constraints on behaviors;
   selecting, for the subject vehicle, a second set of rules to follow from the plurality of rules based on the first set of rules predicted to be followed by the agent;
   observing a second behavior of the agent during a second time period;
   determining whether the agent is behaving in accordance with the first set of rules based on the second behavior;
   adjusting the first set of rules when the agent is not operating in accordance with the first set of rules, such that at least one of an adjusted first set of rules is different from the plurality of rules followed by the subject vehicle; and
   adjusting the behavior of the subject vehicle based on the adjusted first set of rules.

2. The method of claim 1, further comprising determining the behavior of the subject vehicle based on the second set of rules.

3. The method of claim 2, further comprising determining a contingency behavior for the subject vehicle based on the first set of rules and the second set of rules.

4. The method of claim 3, in which the behavior of the subject vehicle is adjusted to the contingency behavior.

5. The method of claim 1, further comprising adjusting the second set of rules in response to adjusting the first set of rules.

6. The method of claim 1, in which the agent is a vehicle, a pedestrian, or a cyclist.

7. The method of claim 1, in which the first behavior and the second behavior are observed by at least one of a red-green-blue (RGB) camera, a light detection and ranging (LIDAR) sensor, or a combination thereof.

8. An apparatus for configuring a behavior for a subject vehicle, comprising:
   a memory, and
   at least one processor coupled to the memory, the at least one processor configured:
      to predict a future behavior of an agent based on a first behavior of the agent observed during a first time period;
      to select, based on the observed first behavior, a first set of rules predicted to be followed by the agent when performing the future behavior, the first set of rules selected from a plurality of rules followed by the subject vehicle, and the plurality of rules providing constraints on behaviors;
      to select, for the subject vehicle, a second set of rules to follow from the plurality of rules based on the first set of rules predicted to be followed by the agent;
      to receive a second behavior of the agent observed during a second time period;
      to determine whether the agent is behaving in accordance with the first set of rules based on the second behavior;
      to adjust the first set of rules when the agent is not operating in accordance with the first set of rules, such that at least one of an adjusted first set of rules is different from the plurality of rules followed by the subject vehicle; and
      to adjust the behavior of the subject vehicle based on the adjusted first set of rules.

9. The apparatus of claim 8, in which the at least one processor is further configured to configure the behavior of the subject vehicle based on the second set of rules.

10. The apparatus of claim 9, in which the at least one processor is further configured to determine a contingency behavior for the subject vehicle based on the first set of rules and the second set of rules.

11. The apparatus of claim 10, in which the behavior of the subject vehicle is adjusted to the contingency behavior.

12. The apparatus of claim 8, in which the at least one processor is further configured to adjust the second set of rules in response to adjusting the first set of rules.

13. The apparatus of claim 8, in which the agent is a vehicle, a pedestrian, or a cyclist.

14. The apparatus of claim 8, in which the first behavior and the second behavior are observed by at least one of a red-green-blue (RGB) camera, a light detection and ranging (LIDAR) sensor, or a combination thereof.

15. A non-transitory computer-readable medium having program code recorded thereon for configuring a behavior for a subject vehicle, the program code executed by at least one processor and comprising:
  program code to predict a future behavior of an agent based on a first behavior of the agent observed during a first time period;
  program code to select, based on the observed first behavior, a first set of rules predicted to be followed by the agent when performing the future behavior, the first set of rules selected from a plurality of rules followed by the subject vehicle, and the plurality of rules providing constraints on behaviors;
  program code to select, for the subject vehicle, a second set of rules to follow from the plurality of rules based on the first set of rules predicted to be followed by the agent;
  program code to receive a second behavior of the agent observed during a second time period;
  program code to determine whether the agent is behaving in accordance with the first set of rules based on the second behavior;
  program code to adjust the first set of rules when the agent is not operating in accordance with the first set of rules, such that at least one of an adjusted first set of rules is different from the plurality of rules followed by the subject vehicle; and
  program code the behavior of the subject vehicle based on the adjusted first set of rules.

16. The non-transitory computer-readable medium of claim 15, in which the program code further comprises program code to configures the behavior of the subject vehicle based on the second set of rules.

17. The non-transitory computer-readable medium of claim 16, in which the program code further comprises program code to determine a contingency behavior for the subject vehicle based on the first set of rules and the second set of rules.

18. The non-transitory computer-readable medium of claim 15, in which the agent is a vehicle, a pedestrian, or a cyclist.

19. The non-transitory computer-readable medium of claim 15, in which the first behavior and the second behavior are observed by at least one of a red-green-blue (RGB) camera, a light detection and ranging (LIDAR) sensor, or a combination thereof.

* * * * *